(12) United States Patent
Barahona Osorio et al.

(10) Patent No.: US 11,000,974 B2
(45) Date of Patent: May 11, 2021

(54) METHOD FOR RECYCLING HIGH-DENSITY POLYETHYLENE (HDPE) MATERIAL BY THERMOFUSION AND RECYCLED HDPE PRODUCTS

(71) Applicant: SOCIEDAD COMERCIAL HARUT SPA, Vina del Mar (CL)

(72) Inventors: Gabriel Ignacio Barahona Osorio, Vina del Mar (CL); Silvia Montserrat Bruna Paez, Vina del Mar (CL)

(73) Assignee: SOCIEDAD COMERCIAL HARUT SPA, Vina Del Mar (CL)

( * ) Notice: Subject to any disclaimer, the term of this patent is extended or adjusted under 35 U.S.C. 154(b) by 0 days.

(21) Appl. No.: 16/341,802

(22) PCT Filed: Oct. 13, 2017

(86) PCT No.: PCT/CL2017/050058
§ 371 (c)(1),
(2) Date: Apr. 12, 2019

(87) PCT Pub. No.: WO2018/068159
PCT Pub. Date: Apr. 19, 2018

(65) Prior Publication Data
US 2019/0315019 A1   Oct. 17, 2019

(30) Foreign Application Priority Data

Oct. 14, 2016   (CL) .................. 201602617

(51) Int. Cl.
*B29B 17/04* (2006.01)
*B29B 9/02* (2006.01)
*B29C 51/00* (2006.01)
*B29C 51/26* (2006.01)
*B29B 17/02* (2006.01)
*B29K 23/00* (2006.01)

(52) U.S. Cl.
CPC ............ *B29B 17/04* (2013.01); *B29B 9/02* (2013.01); *B29C 51/002* (2013.01); *B29C 51/264* (2013.01); *B29B 2017/0289* (2013.01); *B29B 2017/0468* (2013.01); *B29K 2023/065* (2013.01); *C08L 2207/062* (2013.01)

(58) Field of Classification Search
USPC ......................................... 528/47
See application file for complete search history.

(56) References Cited

U.S. PATENT DOCUMENTS

2010/0216902 A1   8/2010   Wendelin et al.

FOREIGN PATENT DOCUMENTS

| CN | 104497390 A | 4/2015 |
| ES | 2385105 | 7/2012 |
| WO | 2013070176 A1 | 5/2013 |
| WO | 2014089062 A1 | 6/2014 |

OTHER PUBLICATIONS

PCT International Search Report for International Application No. PCT/CL2017/050058, dated Feb. 13, 2018, 3 pages.
Russian Office Action for Application No. 2019113721, dated Mar. 11, 20020, 13 pages.
Lyubeshkina E.G., Recovery of polyolefine waste. 1985, pp. 10.
"Vuelvo Material recycles plastic nro.2 of Valparaiso and transforms it into objects of daily use," Posted on Feb. 29, 2016. https://www.disup.com/vuelvo-material-reciclaje-valparaiso-chile.
"How to Recycle HDPE Plastic (High Density Polyethylene)—a simple method," Atomic Shrimp, Dec. 7, 2012, https://youtu.be/W_XUJwINdLw.
"Precious Plastic—Create things from plastic (part 5.0)—How to Make a Recycled Plastic the Easy Way," One Army, Mar. 24, 2016, https://youtu.be/VdUkOjIP0Ok.
Jefferson Hopewell et al., Plastics recycling: challenges and opportunities, The Royal Society Publishing, Philosophical Transactions of the Royal Society B, Biological Sciences, Jul. 27, 2009, https://royalsocietypublishing.org/doi/10.1098/rstb.2008.0311.

*Primary Examiner* — Terressa Boykin
(74) *Attorney, Agent, or Firm* — Hoffman Warnick LLC

(57) ABSTRACT

The present invention relates to a process for recycling waste high density polyethylene (HDPE) materials, which is carried out by thermofusion. Through this recycling process, products having particular qualities are obtained, and laminated products or products in the form of a molded block may be obtained. Said products, in addition to representing a benefit for the environment, exhibit particularities that make them different from virgin raw material products and recycled products, representing a surprising and unexpected technical advantage over those currently available.

20 Claims, No Drawings

METHOD FOR RECYCLING HIGH-DENSITY POLYETHYLENE (HDPE) MATERIAL BY THERMOFUSION AND RECYCLED HDPE PRODUCTS

The present invention relates to a process for recycling waste high density polyethylene (HDPE) materials, which is carried out by thermofusion. Through this recycling process, products having particular qualities are obtained, and laminated products or products in the form of a molded block may be obtained. Said products, in addition to representing a benefit for the environment, exhibit particularities that make them different from virgin raw material products and recycled products, representing a surprising and unexpected technical advantage over those as currently available.

PRIOR ART

It is clear that, over the past hundred years, across the world, there has been a constant human development, where said development comprises the widest fields, such as social development, industrial development and technological development. However, a large number of industry and social developments leave a footprint that is reflected in the society environment itself. It is highly recognized that industrial development has left a contaminating trail that, for a long time, was not considered as a relevant element that affected human life. The very technological progress has generated a social development that was not considered at the time. It is worth mentioning the high population growth of important cities, originally due to the need for labor to sustain said industrial development. However, said industrial and social development has generated technical needs for the comfort and survival of human beings; although, paradoxically, such needs for comfort and survival have caused serious problems for human beings themselves.

Undoubtedly, all human development has generated harmful contaminating elements that affect, in different ways, human life, such as: air pollution, water pollution, noise pollution, pollution by solid waste and others. A particular case is the important development of polymeric materials and the manufacture of different products from said polymeric materials, which, on the one hand, have provided comfort for daily needs of humans beings, but, on the other hand, the disposal of said products from polymeric materials has caused a significant environmental problem.

In recent decades, the development and use of polymeric materials, generally known as plastic materials, has not only been beneficial, it has also caused a strong increase in waste generation. The latter is due to different causes, among which are: the use in short useful life products that are quickly discarded by users; it has been estimated that around 50% of the plastics produced go to single-use applications, between 20% and 25% are used in construction works and the rest in the manufacture of other products, such as electronics, furniture and vehicles. The plastics with the strongest presence in waste are polyethylene (PE) and polyethylene terephthalate (PET), because they represent the largest proportion in containers and packaging.

Within the extensive range of polymeric materials, without a doubt, polyethylene (PE) is probably one of the worlds most popular plastics. Polyethylene is a polymer that results from the polymerization of ethylene. Polyethylene was discovered by British chemists in 1933. Early applications of polyethylene were developed based on its excellent electrical properties; it is mainly for this reason that it was used as insulator in undersea cables and as a coating for other conductors, thus absorbing most of the manufactured material. Until 1949, those killed in the art thought that ethylene could only be polymerized at high pressure; however, between 1949 and 1955, researcher Karl Ziegler developed an absolutely revolutionary process for obtaining polyethylene at normal pressure. In essence, said process consisted in the injection of ethylene in a suspension of aluminum ethylate and titanic ester in an oil, in this way, ethylene is polymerized with heat release and forms a macromolecular product. With the new process of Karl Ziegler, more than 100,000 monomers could be bound in a macromolecule, a breakthrough considering that, with the high pressure method, only 2,000 monomers could be bound in a macromolecule.

Polyethylene materials can be classified based on their density as:
  Low Density Polyethylene (L
  Linear Low Density Polyethylene (LLDPE)
  High Density Polyethylene (HDPE)
  High Molecular Weight High Density Polyethylene (HMW-HDPE)
  Ultra High Molecular Weight Polyethylene (UHMWPE).

Although more generally, the most popular polyethylene materials are low density polyethylene (LDPE) and high density polyethylene (HDPE).

High density polyethylene (HDPE) was originally developed as a material, such as a film, for packaging. In 1964, it began to be used in milk bottles. Thanks to the important advantages it has, provided by its properties both in price and in chemical and mechanical resistance against other products, its use has grown dramatically in many applications.

High density polyethylene is normally produced with a molecular weight that is in the range between 200,000 and 500,000, but may be higher. It is an unbranched straight-chain polymer. It is harder, stronger and a little heavier than low density polyethylene, but it is less ductile. HDPE is a translucent material, characterized by its rigidity and breakage resistance, it is inexpensive, easy to mold, and used in most milk, water and juice bottles.

At present, HDPE has a wide range of applications in various industries. Thus, more than a half of its use is for the manufacture of containers, lids and packages; another large volume is molded for household utensils and toys; also an important use is for pipes and ducts. Its use for packaging has increased due to its low cost, flexibility, durability, its ability to withstand the sterilization process, and resistance to many chemicals. Among many other products in which HDPE is used, one can mention barrels of lubricating oil and for organic solvents, cutter handles, gas tanks, milk bottles, plastic bags and toys. It is also used in the formation of sheets.

The production of materials and products formed from HDPE obviously generates waste, which in many cases is discarded in landfills. For this reason, it becomes relevant to be able to recycle plastic materials in general.

Recycled containers, manufactured from HDPE, are used in detergents, motor oils, garbage cans, bins, pipes, industrial pallets, cones for traffic barriers, etc. Recycling of plastic materials is a skill within the field of solid waste. Recycling is a process by which waste is used to obtain new products. Thus, through recycling, it is possible to provide environment protection to some extent because:
  Natural resources are preserved.
  Pollution sources are avoided.
  Industries save energy and reduce production costs.

Municipalities reduce their costs for collection, transportation and final disposal of trash.

Useful life of landfills is extended.

Jobs are generated.

To recycle any material present in the waste, it must be able to be processed into a viable and clean type of raw material. This raw material must then be converted into a product. Then, said product must be commercialized and distributed.

Recycling of plastic products involves their recovery and reprocessing when their useful life expires, i.e., when they are discarded, so that they can be used in new applications. The environmental impact generated by plastic materials is very relevant since they have the following characteristics:

Their resistance to degradation, a condition that causes their accumulation in landfills.

Plastic materials may contain a series of additives, such as stabilizers, reinforcing agents, plasticizers, etc., which can generate their own environmental effects.

Their low density causes a greater visual impact and an increase in the cost of their collection and transportation.

Therefore, recycling is important for many reasons, among these good reasons, it is generally mentioned that it is good for the environment because it reduces waste. Despite the recognition of the benefits of recycling, still a large percentage of recyclable materials continue to reach landfills.

Like other recyclable materials, HDPE has substantial benefits when recycled, for example:

when recycling HDPE, plastic material is removed from the waste stream, which means that total costs of removal of waste in landfills can be reduced;

recycling of HDPE provides a means to generate income from material that is removed from the waste stream that is destined for the landfill;

recycling of HDPE can simplify the general operations of treatment of the remaining waste;

recycling of HDPE can help with safety and cleanliness of work places where HDPE products are used.

It is more profitable to produce a recycled HDPE product than to produce it from "virgin" plastics.

HDPE is accepted, without any problem, in most recycling centers across the world because it is one of the easiest to recycle plastic polymers. Most recycling companies collect discarded HDPE products and can move them to large facilities for processing. Currently, the technique used for recycling HDPE involves classification and separation of the material in order to remove unwanted waste, so that only HDPE is processed. After that, HDPE material is crushed and melted at high temperature, two types of end products can be obtained from recycling, the first is in the form of pellets, which will later be used in the formation of other products; and the second can be a product formed by extrusion and blowing, by means of which mainly containers for detergents or motor oils are produced. In short, recycling of HDPE is currently carried out by means of two techniques: (i) extrusion; and (ii) blowing.

Invention patent application US 2004241473 describes a HDPE recycling process, in which a combination of the two abovementioned techniques is used, that is, the discarded HDPE material receives an extrusion-blowing molding processing, under which fuel tanks or pipes can be produced.

Spanish publication ES 2385105 describes a process for the pretreatment and reconditioning of polyolefin plastic material to be recycled in the form of high density polyethylene (HDPE), low density polyethylene (LDPE), polypropylene (PP), or mixtures of these plastic materials, the material being present in the form of flakes of crushed packages or of granules, the plastic material to be processed heating and at the same time crystallizing, drying and/or purifying in at least one collection or reaction container under continuous mixing for pretreatment and reconditioning of the plastic material. The material is heated at a specific temperature (between 50° C. and 130° C. for the case of HDPE), and then mixed and crystallized; finally, the material is conveyed to an extruder or processed to be converted into a pellet.

Therefore, there is not, nor is it suggested, in the prior art, a thermofusion process for recycling HDPE, such as that described in the present invention. The process of the present invention provides a practical, economic and innovative solution for recycling HDPE, because it uses a simple technique for handling and does not require large and expensive crystallization and/or extrusion equipment. In addition, the process allows direct production of various recycled HDPE products, which are formed in the same mold of the thermofusion furnace and have, finally, characteristics and physical properties that cannot be achieved through known HDPE recycling processes. The form, the physical and chemical properties, the appearance and the costs of the recycled HDPE products obtained by means of the thermofusion process of the present invention provide a surprising and unexpected effect with respect to that described in the prior art.

SUMMARY OF THE INVENTION

The present invention relates to a process for recycling high density polyethylene (HDPE) materials by means of thermofusion, which comprises the steps of:

crushing waste HDPE containers;

storing crushed material in maxi sacks;

pouring the crushed material into a wash container;

washing the crushed material with a biodegradable degreaser;

rinsing the crushed material with pure water;

storing clean crushed material in maxi sacks;

pouring the clean and dry, crushed material into a thermofusion furnace;

boiling, by thermofusion, the material under specific conditions;

removing the thermo-fused product from the thermofusion furnace;

pressing the thermo-fused material; and extracting the molded product.

The invention also discloses a planchette-shaped laminated product, which is comprised of a HDPE recycled material and has an upper surface and an opposite lower surface.

The invention also relates to a product in the form of a block, which is comprised of a HDPE recycled material, and may have different regular and/or irregular surfaces.

DETAILED DESCRIPTION OF THE INVENTION

For a better understanding of the present invention, the meaning of the following expressions must be clear:

Thermofusion: corresponds to a molecular fusion, by high temperature, turning the fused parts into a single piece.

Container: objects or utensils that have a cavity that allows introducing liquids, solid elements or even gases, according to their characteristics. Within what can be understood as container are very diverse objects, of different shapes and sizes, and created with all types of materials; although for the present case, only those formed by a plastic material are targeted.

Maxi-sack: a flexible container used for storage and/or packaging of various products or materials; in the case of the present invention, crushed HDPE is stored. Its size is configured according to needs, but can range from 500 to 2,000 kilograms.

Laminated product: a product having flat surfaces and specific length, width and thickness, including two opposite surfaces.

The present invention relates to a process for recycling high density polyethylene (HDPE) materials by means of thermofusion, by means of which products made of recycled HDPE can be obtained, which have their own characteristics that are not available in the prior art, such as, for example, planchette-shaped laminated products or products in the form of blocks with different regular or irregular surfaces.

Known techniques for recycling HDPE materials have the extrusion of the material as a central element, which makes the type of product that may be formed from known recycling processes to be limited. In fact, the products manufactured from recycled HDPE material that are currently available are only confined to pellets for second applications and containers for detergents, motor oils and garbage. In the present invention, products manufactured directly from a process of recycling HDPE by means of thermofusion are described.

The recycled HDPE products of the present invention have characteristics that are not found in other HDPE materials manufactured by another process. Thus, the products of the present invention have:

Sustainability: allows the use of recycled material in applications where virgin material could have been used, thus satisfying needs without exhausting the available natural resources.

Durability: duration of the product can be up to 600 years.

Texturable: at least one of the surfaces of the product can have some degree of texture.

Versatility: it can be used in interior and exterior spaces.

Waterproof: given its polymeric qualities, it is not affected by water, it is impermeable.

Temperature: it resists high thermal oscillations in the environment.

Atmospheric changes: its structure or form is not altered due to atmospheric changes Shocks: its high mechanical resistance helps it resist normal shocks.

Antibacterial: its inert surface does not generate the proliferation of bacteria.

Ease of cleaning: its chemical and mechanical resistance allows the ease of surface cleaning.

Current insulator: because it is a very bad current conduction material, it serves as a current insulator It does not lose color: it does not suffer variations in color or texture.

Resistance to alcohols, ketones, greases and oils: due to its chemical resistance quality.

Non-toxic.

After repeated and successive tests, a thermofusion process has been developed for recycling waste HDPE materials. Technically, thermofusion is a process by means of which molecular fusion of at least two pieces or products is achieved, becoming one single piece. The thermofusion process is developed under controlled temperature and pressure conditions, while the duration of the process will depend on the type of product that is produced.

In the case of the present invention, the complete process of recycling HDPE materials will be largely conditioned by the relevance of thermofusion.

Logically, the recycling process begins with the collection of waste materials; once the HDPE material is collected, the development of the process of the present invention is technically begun, which comprises, in general terms, the following steps:

CUTTING: The required quantity of HDPE bottles are placed in a chipping machine to achieve 1×1 cm and maximum 10×10 cm cuts, which are then stored in maxi-sacks, which may hold up to 1 ton.

WASHING, RINSING AND DRYING: The next step is washing, where the proportion is 25% biodegradable degreaser per 20 liters of water. This process should last between 10 and 14 minutes. Its technical specifications are directly related to the resting phase, which allows chemistry to act directly on the plastic until it completely clears dirt. After rinsing with pure water, for a period between 1 and 3 minutes, the plastic goes to an industrial filter, which works as a dryer, with a motor that rotates at a speed equal to 80 Km/h, for a period between 1 and 3 minutes. This is when the chip is ready to be stored in another maxi-sack to move to the Boiling step.

BOILING: The amount of material to be boiled will depend on the object to be obtained. That range of variation will be between the same amount required to achieve the object, pouring into the mold in one go (laminated products); or one third of the estimated amount needed for a particular object, in one go, in three steps (block products). The furnace, if a gas-burned furnace, must remain on one hour before introducing the material; if the furnace is electric, it must be turned on half an hour before introducing the material, reaching in both cases a temperature between 150° C. and 158° C. For laminated products, the material is poured into the mold in one go, and after one minute, the furnace temperature is raised to 170° C.; during the next seven minutes, this temperature will range between 170° C. and 180° C. Then, the product is removed from the furnace. For block products, on the other hand, the material is poured into the mold in three equal parts, each one at its own time; this as a way to ensure the stability of the material. The first layer stays for 8 minutes, the second one is poured at 4 minutes, and the third one at 3 minutes, totaling a time of 15 minutes. The furnace temperatures corresponding to each of these time periods are also defined: after one minute, the furnace temperature is raised to 170° C.; in the second and third pouring (equivalent to two and three thirds of the material), the temperature will not be modified and will range between 170° C. and 180° C. At that point, the HDPE thermo-fused product, recycled, is removed from the furnace, to move to the next step: pressing. In parallel, both for the case of laminated products and block products, the furnace is left open for 10 seconds, where temperature drops to a range from 150° C. to 158° C., being able to start a new process.

PRESSING: In 10 seconds, after being removed from the furnace, the product must be in the hydraulic press. For laminated products, pressing is carried out for 5 seconds, and products are hooked on the press "T's" and then submerged in water that has to be cold, at a temperature close to 5° C., for a period between 3 and 5 minutes. Then, the mold is opened and the laminated plate is removed. For block products, the product hooking mode changes; thus, while in laminated products hooking is carried out from the surface towards the bottom of the mold, in block products the mold faces are hooked, because the greater the volume, the more difficult to extract the product from the mold. Then the product is submerged in water at the same temperature, but for a period of 5 to 10 minutes, being ready to be unmolded.

In practical terms, the process of the present invention can be presented sequentially by the following actions.

Process for recycling high density polyethylene (HDPE) materials by means of thermofusion, which comprises the steps of:
  crushing waste HDPE materials;
  storing crushed material in maxi sacks;
  pouring the crushed material into a wash container;
  washing the crushed material with a biodegradable degreaser;
  rinsing the crushed material with pure water;
  storing clean crushed material in maxi sacks;
  pouring the clean and dry, crushed material into a thermofusion furnace;
  boiling, by thermofusion, the material under specific conditions;
  removing the thermo-fused product from the thermofusion furnace;
  pressing the thermo-fused material; and
  extracting the molded product.

In the process for recycling high density polyethylene materials of the present invention, the waste HDPE materials may be containers, sheets or meshes, and during the crushing step, the waste HDPE materials are placed in a chipping machine, crushing until reaching approximate dimensions of 1×1 cm to 10×10 cm; after the material is crushed, it is transferred to maxi-sacks that may contain up to one ton of crushed material.

In the process for recycling high density polyethylene materials of the present invention, in the step of washing the crushed material, the biodegradable degreaser used is neutral and washing time is extended from 10 to 14 minutes, the rinsing steps lasts between 1 and 3 minutes. The drying step is carried out by means of an industrial filter acting as a dryer, whose motor rotates at a speed equivalent to 80 km/h and lasts between 1 and 3 minutes.

In the process for recycling high density polyethylene materials of the present invention, the amount of clean, dry, crushed material poured into the thermofusion furnace will depend on the type of product to be obtained. In the case of laminated products, the same required quantity of crushed material as the end product to be obtained is poured. In the case of block or specific products, one third of the total amount of crushed material required is poured for the end product to be obtained.

In the process for recycling high density polyethylene materials of the present invention, if, in the boiling step, a thermofusion furnace using gas is used, said furnace must be turned on about an hour before the crushed material is poured. If an electric thermofusion furnace is used in the boiling step, said furnace must be turned on about half an hour before the crushed material is poured.

Regardless of the type of furnace used, the thermofusion furnace chamber must reach a temperature between 150° C. and 158° C. when pouring the crushed material. To produce a laminated product, the crushed material is poured into the furnace mold in one go, and after one minute, the temperature of the furnace raises to 170° C., during the following seven minutes, said temperature ranges between 170° C. and 180° C.; finally, the laminated product is taken out of the furnace. When a block product is produced, the crushed material is poured, separately, into three equal parts of crushed material, each of said parts at a specific time, wherein, the first layer of material, equivalent to one third of the amount estimated by product, stays in the furnace for 8 minutes, the second layer is poured in the same mold that contains the first layer and is thermo-fused for 4 minutes, and then the third layer is poured, which is left to thermo-fuse for 3 minutes; the furnace temperatures corresponding to each of the time periods are handled such that, after one minute, the furnace temperature rises to 170° C.; in the second and third variation, equivalent to pouring two and three thirds of the material, the temperature is not modified and will range between 170° C. and 180° C.; finally, once the thermo-fused product is removed from the furnace, said furnace is left open for 10 seconds, the temperature decreasing to a range from 150° C. to 158° C., being, in this way, able to start a new process.

In the process for recycling high density polyethylene materials of the present invention, the pressing of the thermo-fused product is carried out in a hydraulic press, taking care that the thermo-fused product, after leaving the furnace, does not take more than 10 seconds to be moved to the hydraulic press. In the case of the laminated thermo-fused product, it is pressed for 5 seconds, and after being pressed, it is hooked on the press "T's" and submerged in cold water, at a temperature close to 5° C., for a period between 3 and 5 minutes, the mold being finally opened and the laminated product being removed. On the other hand, in the case of the block thermo-fused product, it is pressed for 60 seconds, and after being pressed, it is hooked on the mold faces and submerged in cold water, at a temperature close to 5° C., for a period between 5 and 10 minutes, the mold being finally opened that the block product being removed.

On the other hand, in the present invention, the final HDPE products obtained by the recycling process previously described are also protected. This includes all types of products that can be formed, such as: planchette-shaped laminated products of different dimensions, products for jacketing mine drillings, pipes of different diameter, ornamental and decorative products, insulating products for electrical conductors, and any another type of product that can be technically developed and produced.

One of the important applications that can be obtained through the process of the invention is the production of a planchette-shaped laminated product, which will be comprised of HDPE recycled material, and will comprise an upper surface and an opposite bottom surface; wherein, both surfaces may be smooth, or at least one of the surfaces will be textured. The length and of said planchette-shaped laminated product will range between 5 cm and 2,000 cm, the square planchette being a preferred product, whose dimensions are 60 cm by 60 cm.

The different products that can be produced through the process of the present invention, but, in particular, the planchette-shaped laminated product, may be of a single color, or may be multicolored, and may have veins of different colors.

In the case of producing a product in the form of a block, it will be comprised of a HDPE recycled material and may have different regular and/or irregular surfaces.

As previously mentioned, all recycled HDPE products, which are produced according to the process of the present invention, will have qualities that makes them different from other products of different materials or other products of the same virgin material, such as: durability, texturable, versatility, waterproof, resistant to temperature changes, resistant to atmospheric changes, high mechanical resistance, antibacterial, easy to clean, chemical resistance, electric current insulator and non-toxic. All these qualities give it a technical advantage over recycled products known in the prior art.

The above list of products cannot be considered as limiting in the manufacture of products through the process of the present invention, all those products that can be manufactured according to the process of recycling HDPE by thermofusion should be included as part of the invention.

What is claimed:

1. A process for recycling high density polyethylene (HDPE) materials by thermofusion, comprising the steps of:
    crushing waste HDPE containers to form a crushed material;
    storing the crushed material in maxi sacks;
    pouring the crushed material into a wash container;
    washing the crushed material with a biodegradable degreaser;
    rinsing the crushed material with pure water;
    storing the rinsed, crushed material in maxi sacks to dry;
    pouring the rinsed and dry, crushed material into a thermofusion furnace;
    boiling, in a thermofusion furnace, the crushed material under specific conditions;
    removing the thermo-fused product from the thermofusion furnace;
    pressing the thermo-fused material; and
    extracting a molded product.

2. The process for recycling high density polyethylene (HDPE) materials, according to claim 1, wherein crushing includes placing the waste HDPE containers in a chipping machine.

3. The process for recycling high density polyethylene (HDPE) materials, according to claim 2, wherein the materials are crushed until reaching an approximate dimension from 1×1 cm to 10×10 cm.

4. The process for recycling high density polyethylene (HDPE) materials, according to claim 1, wherein the biodegradable degreaser has a neutral and washing time lasts from 10 to 14 minutes.

5. The process for recycling high density polyethylene (HDPE) materials, according to claim 1, wherein the rinsing step lasts 1 to 3 minutes.

6. The process for recycling high density polyethylene (HDPE) materials, according to claim 1, wherein the thermofusion furnace chamber must reach a temperature between 150° C. and 158° C. when pouring the crushed material.

7. The process for recycling high density polyethylene (HDPE) materials, according to claim 1, wherein the crushed material is poured into the thermofusion furnace, and after one minute, the temperature of the thermofusion furnace is raised to 170° C., during the following seven minutes, said temperature fluctuates between 170° C. and 180° C. producing a the laminated product.

8. The process for recycling high density polyethylene (HDPE) materials, according to claim 1, wherein pouring includes pouring the crushed material in three equal parts at separate times.

9. The process for recycling high density polyethylene (HDPE) materials, according to claim 8, wherein the first part stays in the furnace for 8 minutes, the second part is poured in the same thermofusion furnace containing the first part and is thermo-fused for 4 minutes, and, then, the third part is poured, which is left to thermo-fuse for 3 minutes.

10. The process for recycling high density polyethylene (HDPE) materials, according to claim 1, wherein the pressing of the thermo-fused product is carried out in a hydraulic press.

11. The process for recycling high density polyethylene (HDPE) materials, according to claim 10, wherein the thermo-fused product, after leaving the furnace, does not take more than 10 seconds to be moved to the hydraulic press.

12. The process for recycling high density polyethylene (HDPE) materials, according to claim 10, wherein the thermo-fused product is pressed for 5 seconds.

13. The process for recycling high density polyethylene (HDPE) materials, according to claim 12, wherein the thermo-fused product is submerged in cold water, at a temperature close to 5° C., for a period between 3 and 5 minutes.

14. The process for recycling high density polyethylene (HDPE) materials, according to claim 10, wherein the thermo-fused product is pressed for 60 seconds.

15. The process for recycling high density polyethylene (HDPE) materials, according to claim 14, wherein the thermo-fused product is submerged in cold water, at a temperature close to 5° C., for a period between 5 and 10 minutes.

16. The process for recycling high density polyethylene (HDPE) materials, according to claim 1, wherein the waste HDPE materials may be containers, sheets or meshes.

17. A planchette-shaped laminated product that is made from a waste HDPE material made following the thermofusion recycling process of claim 1, the product having an upper surface and an opposite bottom surface.

18. A planchette-shaped laminated product, according to claim 17, wherein both surfaces are smooth.

19. A planchette-shaped laminated product, according to claim 17, wherein at least one of its surfaces is textured.

20. A recycled HDPE product, made following the thermofusion recycling process of claim 1.

* * * * *